United States Patent [19]

Haynes

[11] Patent Number: 4,828,207
[45] Date of Patent: May 9, 1989

[54] FLUID LOCK

[75] Inventor: William E. Haynes, Rancho Palos Verdes, Calif.

[73] Assignee: The United States of America as represented by the Secretary of the Air Force, Washington, D.C.

[21] Appl. No.: 63,369

[22] Filed: Jun. 18, 1987

[51] Int. Cl.$^4$ ................................................. B64G 1/60
[52] U.S. Cl. ................................ 244/158 R; 244/159; 244/162; 405/192
[58] Field of Search .................... 244/158 R, 159, 161, 244/162; 114/335; 405/189, 192, 193; 49/68; 414/221, 217

[56] References Cited

U.S. PATENT DOCUMENTS

| | | | |
|---|---|---|---|
| 2,807,056 | 9/1957 | Vogt | 49/68 |
| 3,146,500 | 9/1964 | Volkert | 49/68 |
| 3,745,955 | 7/1973 | Devine | 49/68 |
| 4,669,413 | 6/1987 | Cummins | 114/335 |

OTHER PUBLICATIONS

NASA Conference Publication 2426, Space Station Human Factors Research Review, vol. III—Space Station Stabilability and Function: Architectural Research, pp. 48–52, Dec. 3-6, 1985.

Primary Examiner—Galen Barefoot
Assistant Examiner—Rodney Corl
Attorney, Agent, or Firm—William Stepanishen; Donald J. Singer

[57] ABSTRACT

This fluid lock permits transiting an object between different fluid pressure through a transiting hole in a wall separating a higher fluid pressure side from a lower fluid pressure side on opposite sides of the wall; has higher and lower fluid pressure doors, each hinged for pivotal movement between an open position for permitting transiting through the hole from one to the other pressure side and a closed position for sealing the opening; and has a transiting container formed between the doors in closed position, and closely form fitting the transiting object, for minimizing the loss of fluid between the sides during transiting the object through the hole.

15 Claims, 5 Drawing Sheets

FLUID LOCK

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

The field of the invention is to a fluid lock, and method, for permitting transiting an object, such as a human being, between different fluid pressures, wherein the fluid lock may, for example, be:

(1) An air lock in a space shuttle, space orbiter or space station (each sometimes herein called generically a spacecraft); or (2) A waterlock in a submarine, or other submergeable craft, for permitting a human being therein to leave the craft in an enclosing suit, such as a space suit (sometimes called herein an EMU, or extra vehicular mobility unit); and to move through the surrounding fluid (whether it be in space, air, or water) outside the craft in extra vehicular activity (sometimes called herein an EVA).

2. Description of the Related Prior Art

Existing devices are known as air locks, for transiting (such as in air, in space or underwater) from one pressure to a different pressure, such as the low pressure or vacuum of space. Their design has not changed fundamentally since their first use during the construction of the initial underwater subway tunnels in the 19th century. Current designs require the user to either vent the gas from the higher pressure side, or to pump it into storage until ready for repressurization.

Prior art air lock 10 in FIGS. 1 and 2 is now used in existing space orbiter 11 of a space shuttle, and is planned to be used for a space station.

Here are some of the problems in such prior art air locks, which problems are solved by this invention.

Substantial problems arise from suiting up two crew members in air lock 10, located in spacecraft 11 cabin 18. That requires that there be room for two crew members and a helper to simultaneously occupy air lock 10, and for added installed equipment in FIG. 2, such as lighting, space suits 12 and their storage racks 13, ventilation 14, hatch 15 to cabin and hatch 16 to cargo bay 17, foot restraints, and the suit systems checkout console. There are also provisions in air lock 10 for vehicle life support systems or suit servicing panel 20 (supplying oxygen, cooling, communications, etc. during pre-breathing) to be attached to each suit so that suit oxygen supplies and batteries will not be used up while the crew members are going through the procedures prior to exiting air lock 10 into the vacuum of space.

More problems are added by traveling through the existing lock 10, and arise not only from the long time required to prepare for, and to, travel through the air lock, but also the large gas or air volume that must be handled by venting, or by pumping and/or storing.

A long time is required to travel through air lock 10. Two crew members enter air lock 10 through cabin hatch 15 along with a third person to help them donn their flexible suits 12. The process of suiting up can take as long as three quarters of an hour, after which the third person exits air lock 10 through cabin hatch 15 to cabin 18. The two suited crew members attach umbilical air hoses and electrical connectors to the outlets built in air lock 10 panel 20 and prepare to wait out three one-half hours of "pre-breathe" time to reduce the amount of nitrogen in their tissues before going onto their EVAs. This is necessary because (1) spacecraft 11 pressure (normally at sea level at 14.7 psi absolute) and flexible suit 12 pressure in space differ greatly, and (2) the nitrogen dissolved in the blood and fatty tissue would otherwise come out of solution during an EVA, producing localized blockage of blood flow, discomfort, and possibly death.

After finishing "pre-breathe", the crew members can disconnect their suits from the spacecraft systems panel 20 and go on internal suit power, complete pre-EVA suit checks and begin to depressurize air lock 10. The gas in air lock 10 is vented in a few minutes. and after final suit integrity checks, the two suited crew members are ready to open outer hatch 16 and egress to cargo bay 17 and to space. On a space station, an additional ten minutes may be required to pump down air lock 10.

The reentry procedures to spacecraft 11 are the reverse of the above, but omit the suit integrity checks.

Handling a large volume of gas in air lock 10 creates problems, whether the gas volume handling be by venting, or by pumping, resupplying, and/or storing.

Venting gases from air lock 10 into space is undesirable because of the contaminants that are carried with the gases, such as water vapor, hair, skin flakes, etc. Cold optical surfaces on the outside of spacecraft 11, for example, will be become coated when contacted by these gases.

The expected large number of EVAs from a space station creates large, potential, logistic costs for resupplying or replacing expended gases lost. Each air lock 10 operation requires pumping air lock 10 down to 2 psi absolute within ten minutes prior to each egress. That requires the installation of a 5 kilowatt pump weighing 300 lbs and over three and one-half feet long for each air lock on a space station. Time to pump down would be in addition to the three one-half hours of "pre-breathe" time mentioned above as required to reduce the nitrogen in the blood stream of the crew members, in order to reduce the probability of "bends" (decompression sickness), which can result if pressure drop exceeds about 5 psi from the initial pressure of 14.7 psi absolute (one atmosphere).

The reduction in vented gas volume in air locks 40, 140 in the present invention will essentially eliminate contamination of cargo bay equipment and will almost eliminate logistic costs associated with resupplying of gases to a space station.

When a suited crew member leaves a spacecraft and travels through space, this is called an extra vehicular space activity or an EVA.

A three (3) EVA limitation is imposed by the limited amount of life support gases available to the crew for repressurizing air lock 10 in space orbiter 11, which gases are vented and lost every time someone exits air lock 10 to perform an EVA from orbiter 11. The limited power and volume available on board orbiter 11 preclude adding a pumping system which could reduce a loss of gases.

Space orbiter 11 depends upon the EVA crew to assure that its cargo bay doors 29 are closed, specially if its remotely operated door actuators should fail to function. This requires that the crew members be prepared to perform and EVA late in the mission, just before reentry, to manually close the doors. This contingency requirement uses up one of the three possible EVAs allowed on a given orbiter 11 flight.

The three EVA limitation, and the long time required to suit up, and to prepare for going, and to go, through air lock 10 force the crew members to remain outside in space for seven (7) hours at a stretch, and carry with them their food to eat and defecating equipment.

More problems are added by the large weight and volume of air lock 10.

Air lock 10 is large enough to just accommodate three people. This is necessitated by the frequent dependence of the two EVA crew members on help from a third party in the donning and checkout of their space suits or EMUs 12. The resulting size of air lock 10, and the necessity for it to sustain a pressure differential of up to a full atmosphere, results in a subsystem which weighs about 1800 lbs and occupies about a one fourth of the available void volume in orbiter 11 cabin 12 mid-deck. In addition, air lock 10 must be equipped with lighting, ventilation, communication, umbilical and electrical connections, and storage racks for the EMUs and other auxiliary equipment. Much of that equipment, such as for lighting and communications, is redundant to what already exists in the mid-deck area, but must be duplicated because of the long isolation of the crew members inside large air lock 10.

The presence of all that mass of air lock 10 in the mid-deck, in a relatively forward location relative to the center of gravity of orbiter 11, contributes to center of gravity limitations, which require the aft location of payloads, such as in space lab 27 in FIG. 3. That aft location, in turn, requires long tunnel 28 between air lock 10, cargo bay hatch 16 and space lab 27, and requires additional outlet hatch 19 for emerging from tunnel 28 into space.

SUMMARY OF THE INVENTION

In contrast, air lock 40 and/or 140 of the present invention substantially eliminates these many problems in the prior art, as will be explained hereinafter.

For example, the requirement that two crew members always conduct an EVA together can be met by providing in FIG. 4 two air locks, such as air lock 40 from FIGS. 5-13 on the left side and air lock 140 from FIG. 14 on the right side, in mid-deck aft bulkhead 34. With an estimated weight of over 300 lbs. each, air locks 40, 140 still represents about a net 1200 lb reduction in crew air lock weight, when compared to the present system, and still provide a two air lock capacity.

This significant reduction in the mass of the equipment required for transiting the mid-deck aft bulkhead 34 in FIG. 4 will translate directly into allowing payload mass increases, and reducing the separation distance from bulkhead 34 to the payloads in cargo bay 36. This will increase payload lifting capacity and improve manifesting flexibility.

These improvements are, however secondary to the direct, favorable effect that air locks 40, 140 will have on orbital operations of any pressurized, manned, air locks for EVAs.

Air locks 40, 140 of the present invention have major advantages arising from these features: (1) By designing transiting container 52 in FIGS. 7, 8 and 14 relatively closely form fitting to transiting object 41, the loss of, and possible contaminants from, pressurant gases are reduced to negligible quantities; (2) the need for pumps is eliminated; (3) the mass, volume and complexity of the fluid lock is materially reduced; (4) the time required to transit the fluid lock is much shorter; and (5) the void volume normally present about the crew member will be occupied by solid, low mass material, transparent in front of the crew member's face. This will very significantly reduce the amount of spacecraft pressurization gases used, and lost when vented, in preparation for egress of the crew members to the low pressure or vacuum side in space.

The residual void volume will be on the order of 1 cubic foot of gas. That is so small compared to the current volume of gases lost that supply of make-up gases will no longer be a limiting factor on the number of EVAs which may be undertaken in a given flight. A typical space station air lock with 216 cubic feet volume, equivalent to a cube 6 foot on a side, contains 16 lbs of air at one atmosphere of pressure. To reduce the pressure to 2 lbs per square inch, as required by a space station, over 14 lbs of air must be pumped out. See the calculations at the end of this specification.

The invention is in a flow lock that permits transiting an object between different fluid-pressure through a transiting hole in a wall separating a higher fluid pressure side from a lower fluid pressure side on opposite sides of the wall; has higher and lower fluid pressure doors, each hinged for pivotal movement between an open position for permitting transiting through the hole from one to the other pressure side and a closed position for sealing the opening; and has a transiting container formed between the doors in closed position, and closely form fitting the transiting object for minimizing the loss of fluid between the sides during transiting the object through the hole.

One object of the invention is to provide a fluid lock and/or method of transiting a pressure differential having the advantages disclosed herein and overcoming the problems in the prior art disclosed herein.

A further object of the present invention is to provide a fluid lock and/or method of transiting a pressure differential characterized by its lower weight and lower costs of manufacture and operation, ease of assembly and manufacture of its component parts, structural simplicity, many desirable operating and use features, multiplicity of functional advantages for some of its component structural parts and method steps, attractive exterior appearance, safe operating characteristics, and long wear life.

These and other objects, novel features and additional advantages of the present invention will become more clearly apparent to one skilled in the pertinent art by reference to the appended claims as the following detailed description of the preferred embodiment(s) of the invention and discussion proceeds in conjunction with the accompanying drawings, wherein like elements are given like reference numerals throughout. The drawings are not necessarily to scale; emphasis instead is being placed upon illustrating the principles of the invention.

DESCRIPTION OF THE PREFERRED EMBODIMENT(S)

Figure 4:
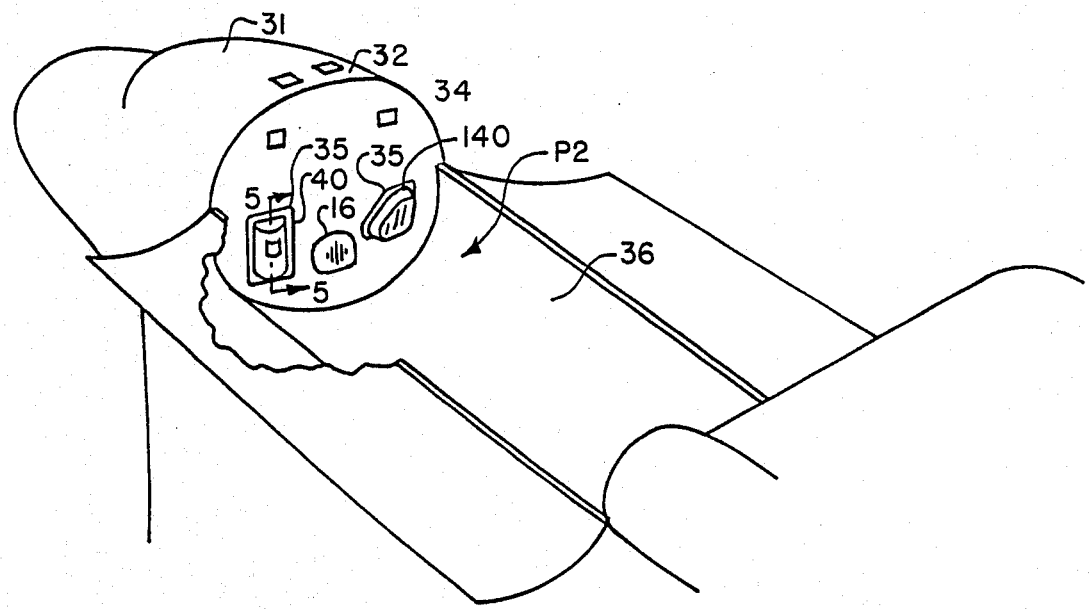
FIG. 4 is a perspective view of the space orbiter in FIG. 1 having installed therein both forms of the fluid lock in the present invention.

Two different fluid locks are disclosed in the present invention. (1) First form of fluid lock 40 in FIGS. 5-13, and (2) second form of fluid lock 140 in FIG. 14. FIG. 4 shows each as installed in aft bulkhead or wall 34 in space orbiter or spacecraft 31, hatch 16 of present air lock 10 is also shown, as it would provide (through a substantially shorter tunnel) access to space lab 27 in cargo bay 36.

Each fluid lock 40, 140 permits transiting object 41 (such as human being or crew member 47 enclosed in space suit 48 in FIGS. 5-8, 10, 11 and 14) between different fluid pressures through transiting hole 35 in aft bulkhead or wall 34. Wall 34 separates higher fluid pressure P1 side at atmospheric pressure inside spacecraft 31 from lower fluid pressure P2 side, such as the near vacuum in space, on opposite sides of wall 34.

Each fluid lock 40, 140 is formed by, and has, independently movable, higher fluid pressure, inner door, 45 on higher pressure side P1 and lower fluid pressure, outer door 46 on lower pressure side P2, herein the vacuum of space. Each door 45, 46 is operatively connected by suitable connecting means, including door hinges 49 and latching means 50, to wall 34 respectively on higher and lower pressure sides P1 and P2 for permitting selective relative movement of each door between: (1) open position T1 for permitting transiting through hole 35 from one to the other pressure side, either from pressure P1 to P2, or from pressure P2 to P1; and (2) closed position T2 for sealing opening 35. When all doors are in closed position T2, transiting container 52 is formed in FIGS. 7 and 8 (and is partially formed in FIGS. 5, 6, 10, 11 and 14) between doors 45 and 46 by their inner surfaces 53 closely form fitting around human being 47 as transiting object 41 for minimizing loss of fluid, such as the air at atmospheric pressure in spacecraft 31 cabin 32 from high pressure P1 side to low pressure P2 side, which is here the vacuum in space. Each fluid lock 40, 140 has parting surface of plane S coplanar with wall 34 in FIGS. 4, 8 and 14 for permitting transiting container 52 to form and to close when doors 45, 46 are in closed position T2, and to open on one side when either door 45 or 46 is in open position T1.

Fluid lock 40 has cylindrical chamber 42 containing transiting container 52: (1) split along parting surface or plane S in FIG. 8 extending longitudinally of, and perpendicularly to, human mid-plane S1 in FIG. 8 of symmetry and being coplanar with opening 35 in wall 34, and (2) sized to accept a fully suited, 95th percentile man 47, or a somewhat smaller or larger man, if so desired. This 95th percentile sizing can be accomplished with an interior length of 200 cm. and an interior diameter 100 cm. (6½ ft by 3⅓ ft).

Figure 14:
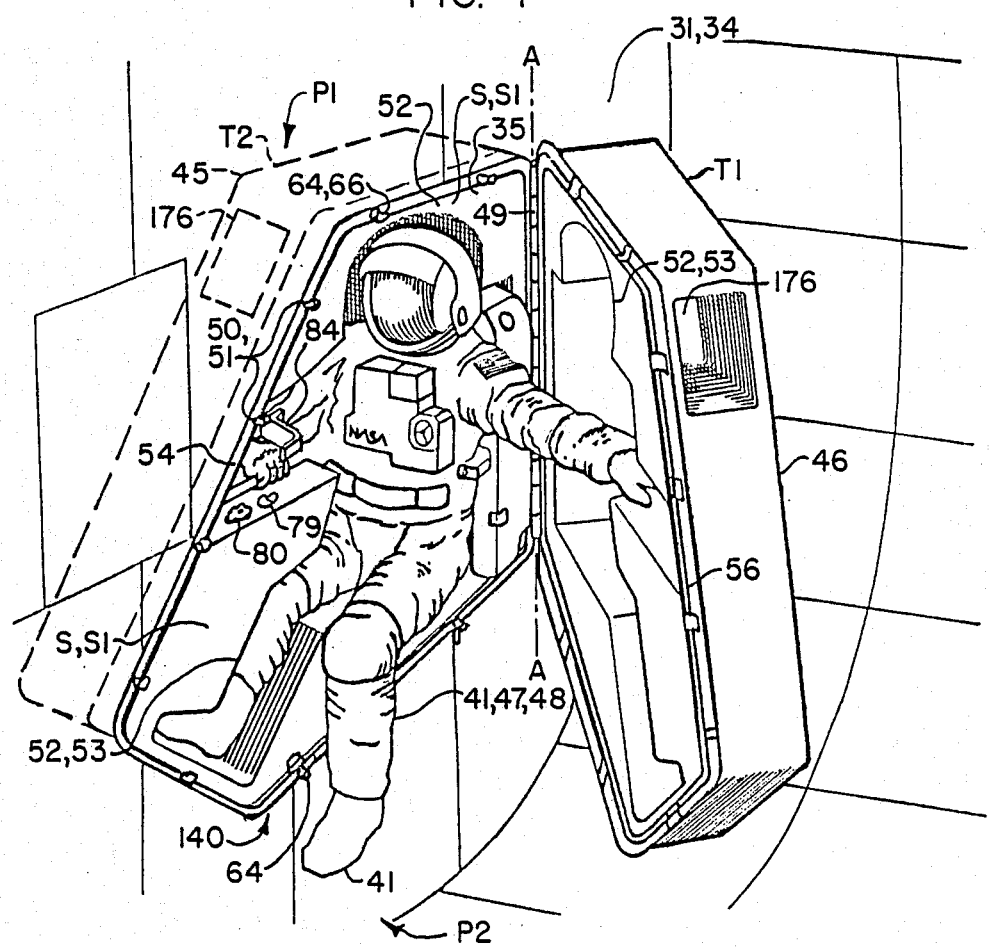
FIG. 14 is a perspective view of a second form of fluid lock with the outer door opened, corresponding to the view in FIG. 10.
Figure 5:
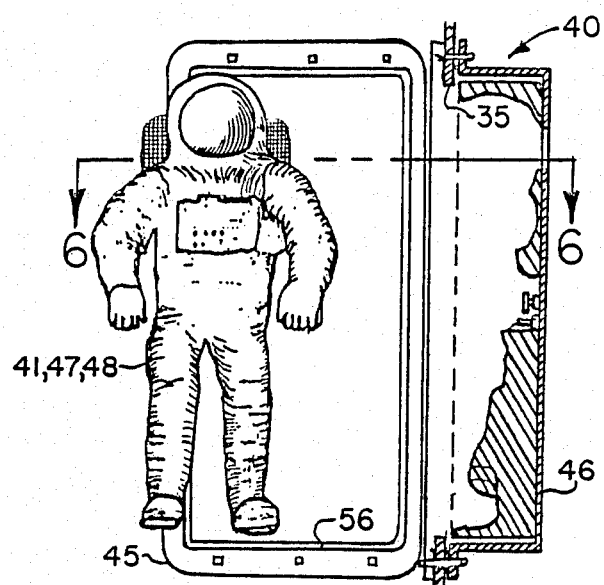
FIG. 5 is a vertical, longitudinal sectional view of the first form of the fluid lock taken generally along the line 5—5 of FIG. 4 but with the left hand or inside door opened.

Fluid lock 140 in FIG. 14 is smaller, and is shown with its parting surface or plane S being on mid plane S1 of symmetry for a sitting human being, and coplanar with opening 35 and wall 34.

Each fluid lock 40, 140 has on each door 45, 46 hinges 49 along one side of each door and latching means 50 along the other three sides of each door.

Doors 45, 46 have. (1) latching means 50 for closing and sealing each door in its closed position T2 with this means including: (a) door pull-up latch members 66, 67, 68 and 69 in FIGS. 11-13, and (b) locking latch member 84 in FIGS. 9 and 9A; and (2) latch interconnecting means 51 operatively connecting latching means 50 for each door, so that one door must be in closed and sealing position T2 before the other door can be moved toward its open position T1, with this means including: (a) latch actuating cable 58 in FIGS. 12 for door pull-up latch members 66, 67, 68 and 69, and (b) latch over center link 85 for locking latch member 84 in FIGS. 9 and 9A.

The action of door pull-up latch member 66, 67, 68 and 69 will be next described.

Each hinge 49 hingedly connects its door 45 or 46 to wall 34 and has hinge pivot line axis A—A shown on the same one side of bulkhead wall hole 35 for both inner and outer doors 45 and 46, so that transiting human being 41 can easily enter and leave transiting hole 35 and transiting container 52 along the same edge or side of hole 35. This places crew member 47 as transiting object 41 in transiting container 52 facing latch operating handle 54 located on the other side (of each oor 45, 46, and of hole 35) from hinges 49, so that human being 47, as transiting object 41, in transiting container 52 is positioned to easily actuate latch operating handle 54 for latching and unlatching doors 45 and 46 selectively in door closed positions T2 by using the latch mechanism in FIGS. 12 and 13. Latching means 50 is of a directly connected, mechanical type to avoid not only the cost and complexity but also the failures of an electrical or hydraulic latching system. Latching means 50 must be, and is, designed and actuated, so as to preclude opening one door until, and unless, the other door is fully closed, locked, secured and sealed in door closed position T2, so that outer door 46 will be closed and sealed before its inner door 45 will be opened and inner door 45 will be closed and sealed before its outer door 46 is opened.

In each drawing FIG. 5-8, 10, 11 and 14, each door 45, 46 has an endless, O-ring type seal 56 connected to its inner face and designed to seal against the outer surface of bulkhead 34 surrounding its hole 35, so that any door 45, 46 in closed position T2 will also be sealed.

Figure 12:
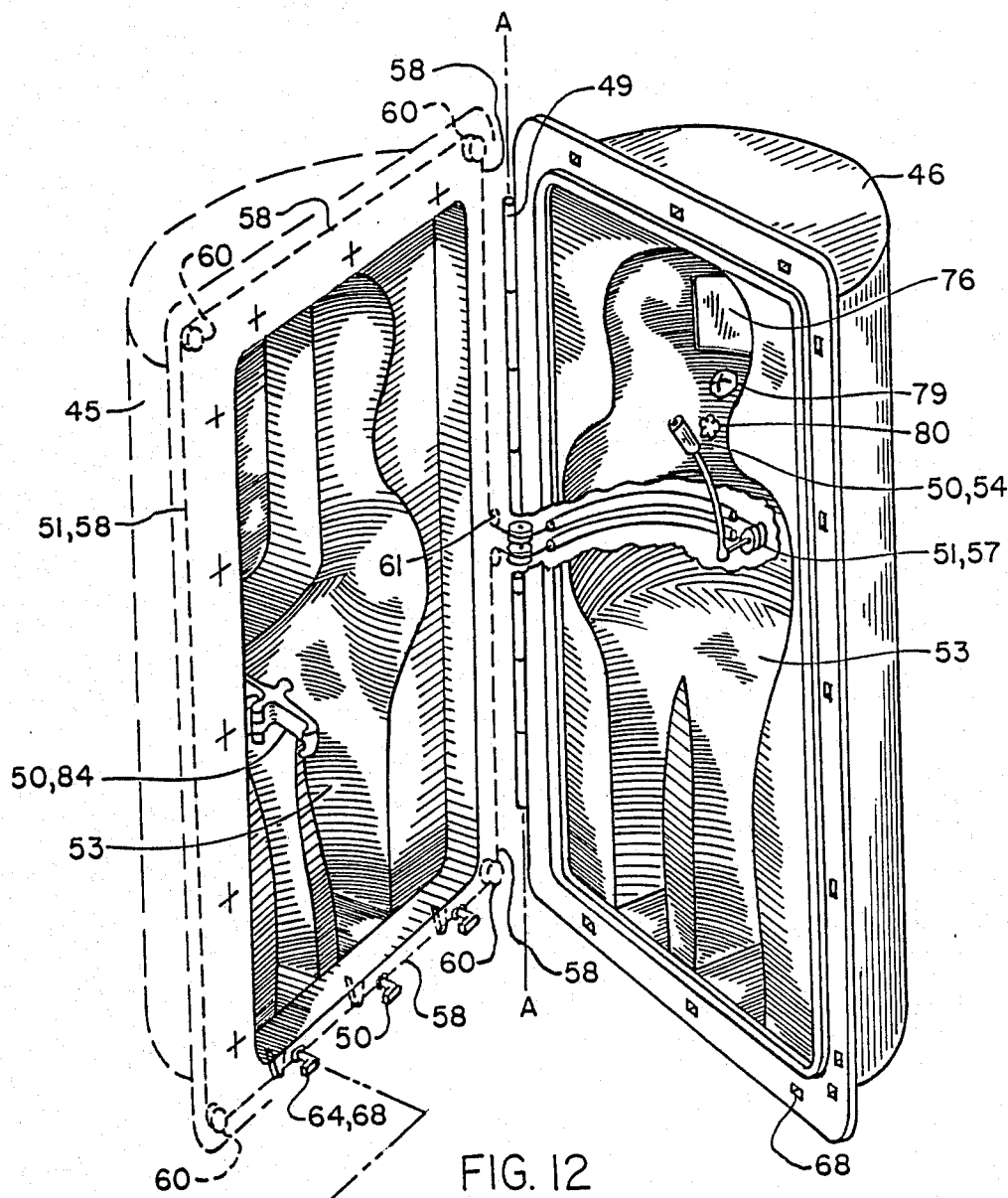
FIG. 12 is a perspective view looking toward and between the opened doors in FIG. 5 or 10 of the first form of fluid lock.
Figure 13:
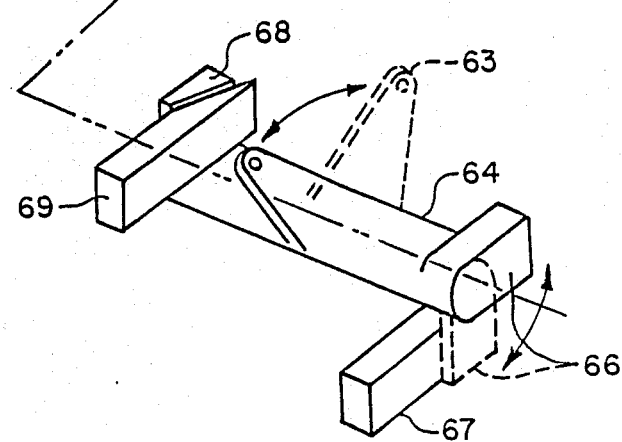
FIG. 13 is a perspective view of one of the latching bell cranks and door pull-up latch members in FIG. 12.

Latch operating handle 45 in each transiting container 52 is pivotally connected, either to outer door 46 in FIG. 12 or to wall 34 in FIG. 14, and rotates pulley 57 to move endless latch actuating cable 58 over pulleys 60 through a passage wy in wall 34 around hole 35 (in FIGS. 12 and 14, only after cable 58 first goes over pulley 61 rotating on the same axis A—A in FIG. 12) to actuate one arm 63 of each bellcrank 64, rotatably mounted in recesses in wall 34 at eleven different locations in FIG. 12 and ten different locations in FIG. 14; for each door 45, 46; on the three sides of each hole or opening 35 not having hinges 49; and each designated by either latch member 66 projecting from wall 34, or schematically by some +s in FIG. 12. As latch actuating cable 58 is moved by rotating latch operating handle 54: (1) in one direction, each and all of its latching bellcranks 64 rotates in FIG. 13 from solid line position to dotted line position to move its bellcrank arm door pull-up latch members 66: (a) into the latching, ditted line position in the right hand portion of FIG. 13 against latch member 67 in outer door 46 to pull-up outer door 46 into its closed and sealed position T2 before inner door 45 is permitted to open after its bellcrank arm latch member 68 moves out of latching engagement with its latch member 69 in inner door 45; or (2) in the opposite direction to the solid line position in FIG. 13 until door pull-up latch member 68, 69 re-engage to pull-up inner door 45 into its locked and sealed position P2 before latch members 66, 67 disengage to permit opening outer door 46. Hence, this may be done by rotating bellcrank latch member 66, 68 in FIG. 13 approximately 90 degrees during door latching and unlatching sequence. That rotation will unlatch one door and latch the other door. This will be accomplished by the direct mechanical interference provided by bellcrank 64 located inside wall 34 between doors 45, 46.

The basic method will be the same for both fluid locks 40, 140, but vary only in accordance with their respective geometries.

This mechanism provides: (1) connecting door pull-up latch members 66, 67 and 68, 69 in a latching means for each door 45, 46 pulling up that door into its closed position T2, and (2) latch operating handle 54, cable 58, pulleys 60 and 61, and bellcrank 64 in a latch interconnecting means operatively connecting these pull-up latch members 66, 67, 68 and 69 for respective doors 45, 46, so that one door must be pulled up into sealing position T2 before the other door can be moved toward open position T1.

The action of locking latch members 84 will next be described.

Figure 9:
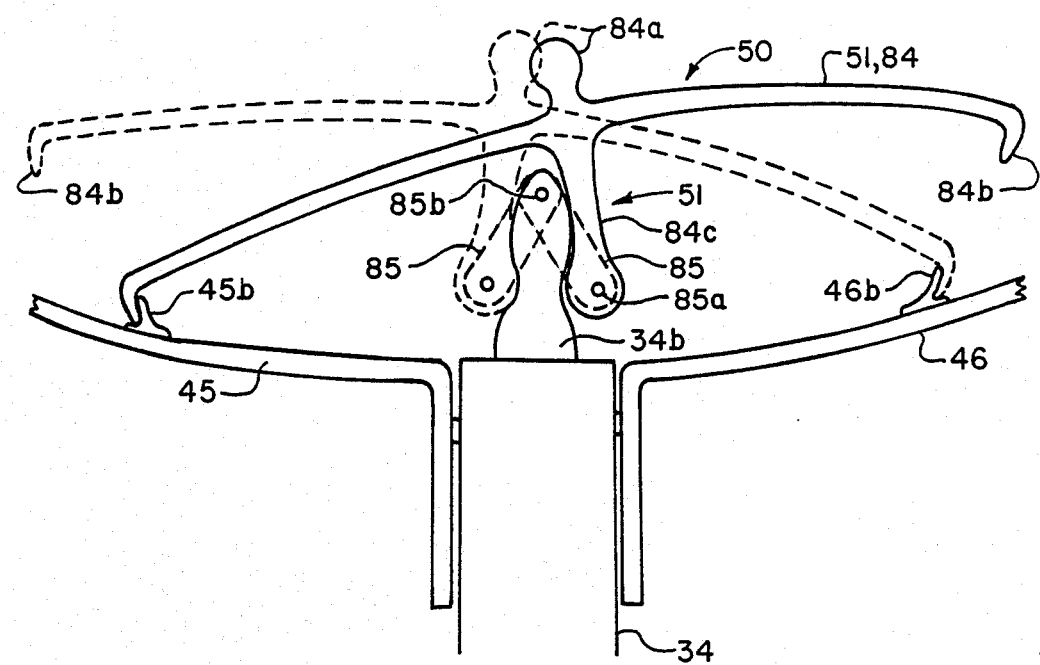
FIG. 9 is an enlarged view, taken generally along the line 9—9 in FIG. 7, of the door locking latch member in FIGS. 6 and 11.
Figure 9A:
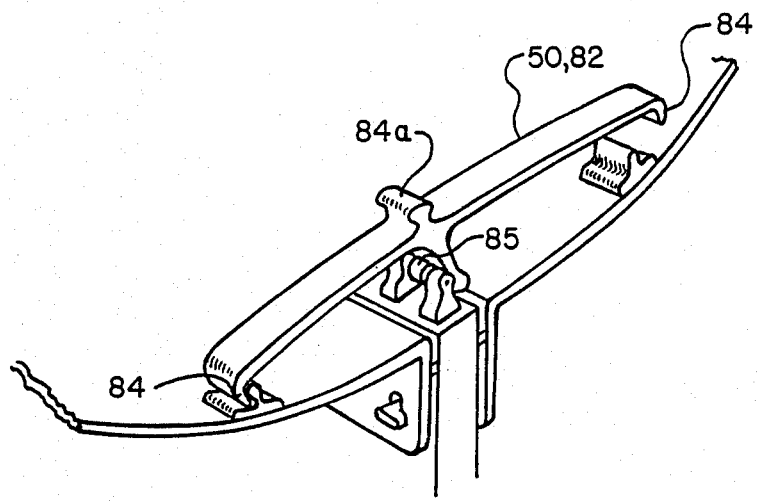
FIG. 9A is a perspective view of the door locking latch member in FIG. 9.

After door pull-up latch members 66 and 67 have pulled-up one door 46 to its closed position T2 before permitting other door 45 to be ready to open, locking latch member 84 in FIGS. 9 and 9A must be actuated to lock door 46 in closed position T2 and to unlock door 45 to permit it to open to position T1. Crew member 47 does this by moving locking latch member 84 from solid to dotted lines position in FIG. 9. Crew member does this by reaching over and manually grasping, or acuating by his elbow, knob 84a on latch member 84. This action engages arm 84b of latch member 84 in FIG. 9 with right hand door lug 46b in dotted line position to lock and seal outer door 46 in position T2, and permits door 45 to open since left hand arm 84b is released from door lug 45b. Arm 84c of member 84 is pivotably connected by pivot 85a to one end of swing link 85, which is pivotably connected at its other end by pivot 85b to arm 34b on bulkhead wall 34 to provide an overcenter, toggle, locking action by swing link 84 for locking and sealing door 46 in this position.

Doors 45, 46 coact to form transiting container 52 by their inner surfaces 53 closely form fitting transiting object 41 for minimizing the loss of fluid from high pressure side P1 to lower fluid pressure side P2 during transiting object 41 through hole 35. Doors 45, 46 have inner faces 53 facing in door closed position T2, and being spaced apart at least the thickness of transiting object 41, so object 41 can be located between door inner faces 53 with both doors in closed and sealed position T2.

Instead of having inner faces 53 integral with, or otherwise secured to, doors 45 and 46, each inner surface 53 may be on space filler means or spacer 74, separate from doors 45 and 46 and detachably or permanently secured to inner face 73 of door 45 or 46 shell 72. Then, spacer 74 may be an expanded synthetic resinous material sold under the trademark STYROFOAM.

If spacers 74 are detachable, spacers 74 may be coated with a synthetic material (which adheres when pressed together, and is sold under the trademark VELCRO) on the outer surface of spacer 74, which will be detachably secured to and against inner face 73 of door shell 72.

An alternate material for spacer 74 can be transparent acrylic with a wall thickness of about ¼ inch and with the interior of the hollow acrylic spacer filled with dry nitrogen gas to prevent being crushed by atmospheric pressure at sea level The advantage of using a transparent material would be reduced claustrophobia for fluid lock 40 or 140 occupant.

A set of such lightweight and rigid spacers 74 will nest together between door shells 72 of doors 45, 46 leaving a void forming transiting container 52 shaped to fit suited crew member 47.

In the event that it is necessary to transfer a large object from spacecraft 31 out through fluid lock 40, VELCRO coated spacers 74 can be removed from the cylindrical version in FIGS. 5–11. Removal of spacers from smaller fluid lock 140 in FIG. 14, while not providing as large a volume as its cylindrical version in FIGS. 5–11, will still permit transit of relatively large objects. Transit of large objects should not be a common practice because of the difficulties caused by exposure of equipment to such large pressure and temperature changes. Those changes pose special design and testing problems that are usually avoided, whenever possible. The resulting loss of gas will have to be accepted. It will still be less than the gases lost from standard size air lock 10, which has been pumped down to 2 psi absolute. See the computations at the end of this description.

If small crew members use fluid lock 40 or 140, they have two choices: (1) they may replace spacers 51 with other spacers pre-selected to conform to their smaller size, or (2) they may accept the loss of some added gases because of the greater void volume in transiting container 52.

Although doors 45, 46 may be made of any suitable material, doors 45, 46 should preferably be made of graphite epoxy composite material in view of the need to reduce weight while assuring adequate strength and other mechanical properties.

Space suit 48 is preferably an all-metal suit (with higher internal and operating pressure and more rapid dunning and doffing capability than flexible suit 12 in the prior art), such as the new Ames Research Center AX-5 all-metal suit, which can operate at higher pressures than suit 12 and eliminate the bends hazard. Using such all-metal suit 48 will permit very rapid and uncomplicated transit through fluid lock 40, 140 to lower pressure P2, and will eliminate the need for pre-breathing to reduce the possibility of the bends hazard. Tests show that transit time through fluid lock 40 or 140 of less than 2 minutes to be a reasonable transit time. Such low transit time will make taking a "lunch break" feasible for the EVA crew members 47 for the first time. They will be able to carry out normal body functions, such as eating and deficating, without having to remain "outside" in outer space vacuum P2 for seven hours at a stretch and will no longer have to carry food with them during an EVA. The ability to transit fluid lock 40 or 140 rapidly will not only save valuable time, but also will enhance safety by permitting rapid response to contingencies calling for an EVA by permitting rapidly and frequently transiting the pressure differential between pressures P1 and P2.

Figure 7:
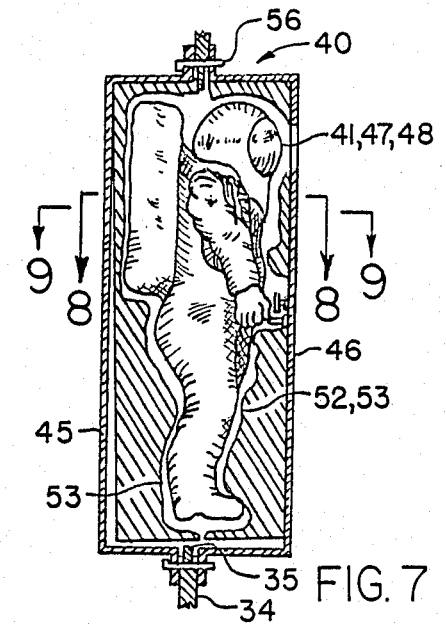
FIG. 7 is a vertical, longitudinal sectional view with the inside door on the left in FIG. 5 closed.
Figure 6:
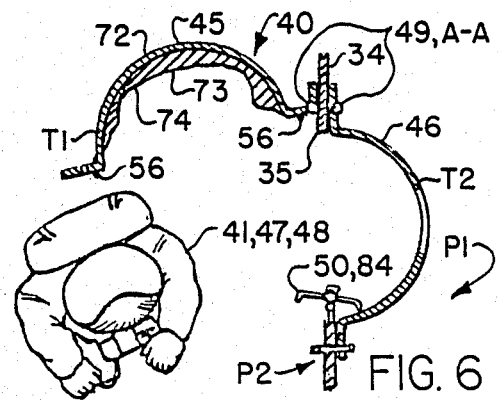
FIG. 6 is a horizontal, cross sectional view taken generally along the lines 6—6 of FIG. 5 with some parts omitted on the right hand door.
Figure 8:
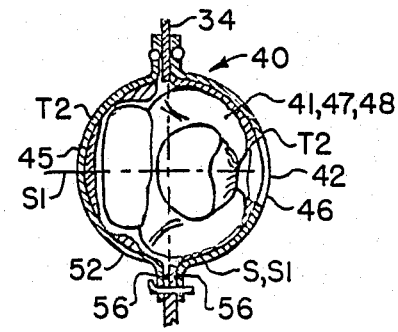
FIG. 8 is a horizontal, cross sectional view taken along the line 8—8 in FIG. 7.
Figure 10:
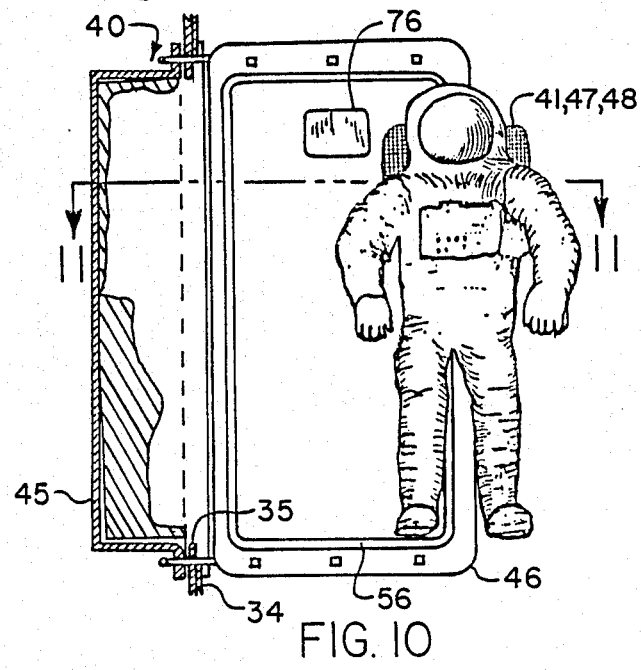
FIG. 10 is a vertical, longitudinal sectional view of FIG. with the right hand, or outer, door opened.
Figure 11:
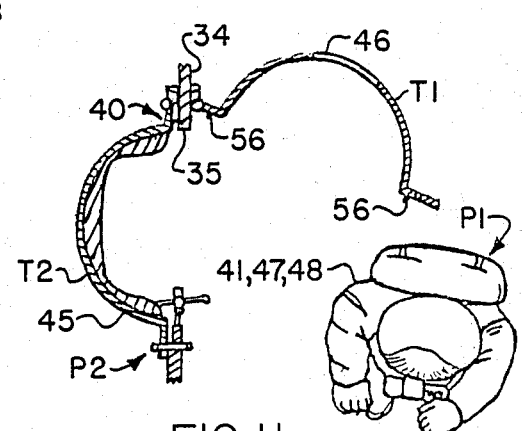
FIG. 11 is a horizontal, cross sectional view taken along the line 11—11 in FIG. 10 with some parts omitted in the right hand door.

Space suit 48 can be stored in transiting container 52 of air lock 40, 140 while doors 45, 46 are in closed position P2, such as in FIG. 7 or 8. This eliminates the need for separate suit racks inside the limited volume of spacecraft 31. Metal suit 48 may be stored without rattling in fluid lock 40 or 140 by adding a blanket of compliant material to take up the residual ¼ inch of space between surface 53 and suit 48. The new Ames suit is an all-metal, hard suit weighing about 350 lbs, so does not require additional, internal support. Prior art suit 12 is made of soft construction and would have to be inflated to maintain its shape while stored in transiting container 52.

Figure 1:
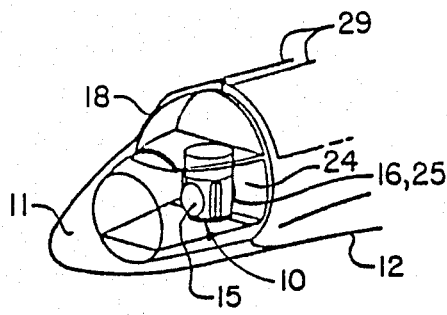
FIG. 1 is a perspective view of a space orbiter in the prior art showing the air lock therein.
Figure 3:
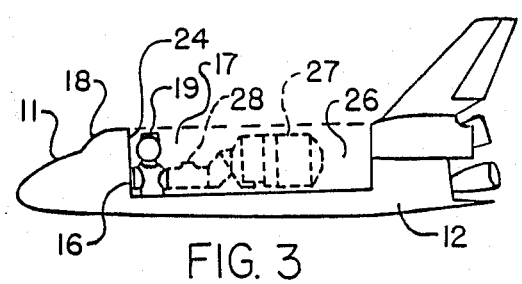
FIG. 3 is a side elevational view of the space orbiter in FIG. 1 of the prior art.
Figure 2:
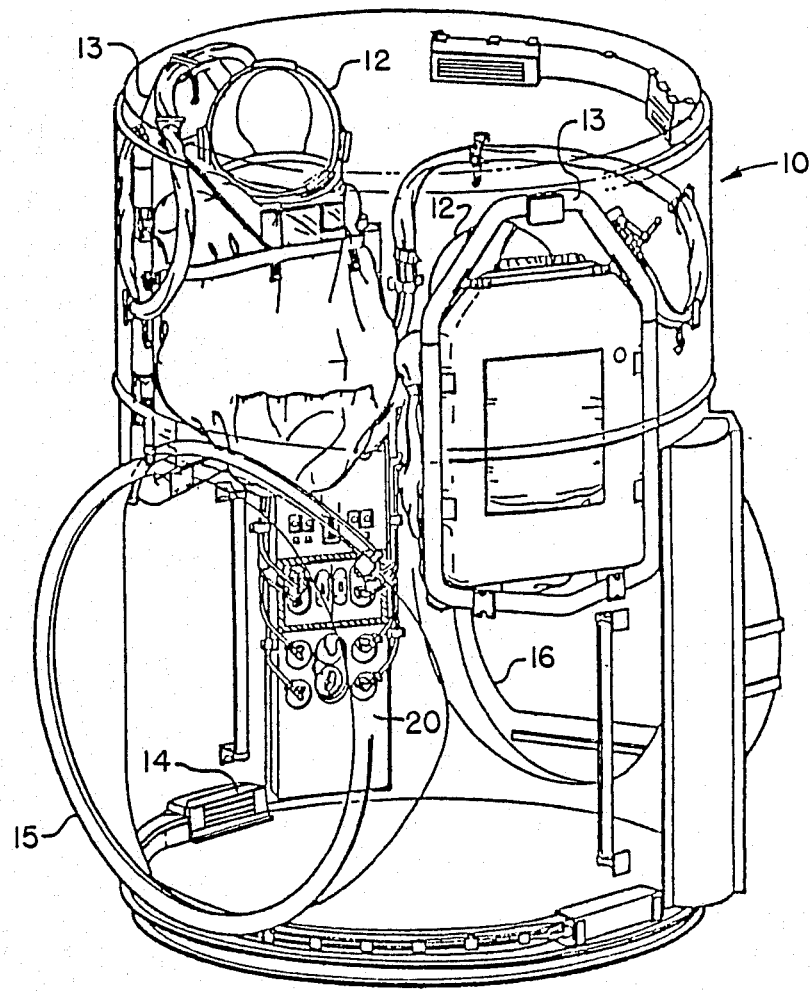
FIG. 2 is an enlarged view of the air lock in FIG. 1.

Fluid lock 40, 140 each provides a storage container for space suit 48 and eliminates the need for much auxiliary equipment such as lights, view ports and hatches or pass throughs in FIG. 2. Instead, the crew members, while suiting up outside fluid lock 40 or 140, occupy a common volume available for other use and illuminated by the normal lighting within spacecraft 31.

Fluid locks 40 and 140 each have some different features, advantages and disadvantages. Fluid lock 40 occupies a greater volume and will probably weigh more. However, by removing spacers 74 and storing them on the interior wall of spacecraft against coacting VELCRO surfaces on this wall, a relatively large volume object can be moved through fluid lock 40 at the cost of some gas loss.

In contrast, small, form fitted fluid lock 140 in FIG. 14 will occupy very little space and weigh less than cylindrical fluid lock 40. Fluid lock 140 is designed to have easy ingress and egress, and to permits its occupant 47 to see simultaneously both the interior and exterior of spacecraft 34 in both pressure sides P1 and P2 while in fluid lock 140 with both doors 45 and 46 in closed position T2, since it has two windows 176, 176 in FIG. 14, one in each door 45, 46. In contrast, fluid lock 40 has only one window 76 in FIGS. 10 and 12 in front of the eyes of human being 47 for looking out on lower pressure side P1. These advantages in fluid lock 140 are gained at the price of the ability to transit bulkier objects, but provide a very small, lightweight, fluid lock.

An ideal combination may be to provide in wall 34 one of each type of fluid lock 40, 140 to be used as needed, as seen in FIG. 4.

Both fluid locks 40, 140 have the same mode of operation, or method, of transiting pressure differential P1, P2. Crew member 47 dons metal space suit 48 in the open area inside spacecraft 31 cabin 32 adjacent to fluid lock 40 or 140; performs a functional check of suit 48 systems; enters fluid locks 40 or 140 after opening its door 45 on high pressure P1 side in FIGS. 5 and 6. If suit 48 requires it, such as non-metal suit 12, crew member 47 will pre-breathe in cabin 32 before entering fluid lock 40 or 140. Once inside, inner door 45 is pulled closed in door pull-up position P2 by handle 54 and door pull-up latch members 68 and 69 to form transiting container 52 about crew member 47 and his space suit 48, or other transiting object 41, and for minimizing fluid loss across pressure differential P1, P2 during transiting object 41. The internal pressure of fluid lock 40, 140 is partially vented to vacuum in low pressure side P2 until its internal pressure is reduced to one half the initial level. Suit 48 pressure is checked by pressure gauge 79 in FIGS. 12 and 14 to veryify it is holding steady; this is a sign of suit integrity. If this is verified, door 45 is latched and locked in closed position P2 by locking latch member 84, and door 46 is unlocked at the same time by member 84; the balance of the small amount of air in fluid lock 40, 140 is vented by actuating vent valve 80 in FIGS. 12 and 14 to change the pressure within transiting container 52 to correspond with lower pressure or vacuum P2; low pressure, exit door 46 is opened; and crew member 47 egresses into vacuum P2. Reentry into cabin 32 at higher pressure P1 is the reverse of this procedure, except that checking for suit integrity is not necessary.

There must be adequate space within transiting container 52 for hand and arm movements of crew member 47 to actuate the necessary controls, including suit 48 pressure check out by pressure gauge 79, and actuation of vent valve 80 and door latching handle 54 and locking latch member 84 knob 84a.

Fluid lock 140 has the same structure and operational features as fluid lock 40 wherever the same reference numerals have been used herein.

The claim that fluid lock 40, 140 without pump-down wastes less gas than conventional air lock 10 with pump-down is based on the following computation for:

Fluid lock 40

Given fluid lock 40 with diameter 3.32 feet (one meter) and length 6.5 ft. (two meters).

Volume = $3.1416 (1.66)^2 \times 6.5 = 56.95$ cu ft

Assume transiting object 41, such as a suited person 41, occupies ⅔ of the void volume, the remaining mass of air = $\frac{1}{3} \times 56.95 \times 32.2 \times 0.0022926 = 1.40$ lbs of air Air lock 10 (with pumping)

Air lock 10 had the size of a 6 ft cube and an interior volume of 216 cu ft., as specified for a proposed space station. Then, at the specified final pressure of 2 psi absolute, the mass of air will be:

$$\begin{aligned}
\text{mass} &= \text{(net) cu ft}^* \times g \times \text{lbs/cu ft at std. press.} \times P/PSTD \\
&= (216 - 37.97) \times 32.2 \times .0022926 \times 2.0/14.7 \\
&= 1.79 \text{ lbs of air.}
\end{aligned}$$

*(net) cu ft = total volume less volume occupied by a suited person.

Therefore, fluid lock 40, 140 without pump down will waste less gas than will full sized air lock 10 with pump-down.

The weight of the air in a six foot cube is: $(6)^3 \times 32.2 \times 0.0022926 = 15.95$ lbs. at one atmosphere pressure. Since less than 1.79 lbs remains after pump-down, over 14 lbs. of air need be pumped out.

To summarize, fluid lock 40, 140 offers any spacecraft 31 —whether a shuttle, orbiter, or space station—a lighter, more efficient pressure wall 34 transiting system, which will almost eliminate gas loss as a logistic or contamination factor, will reduce crew transit time and thus save crew time, will increase safety by permitting very rapid response to any contingency requiring an EVA, will permit an increase in space shuttle 31 payload weight and greater flexibility in cargo bay 36 manifesting and stowage, will provide a convenient storage facility for EMUs 48, and will significantly increase available void volume in the mid-deck area without a major redesign of spacecraft 31.

The invention may be embodied in other specific forms without departing from the spirit or essential characteristics thereof. It is understood that the present embodiment(s) are therefore to be considered in all respects as illustrative and not restrictive, the words which have been used are words of description rather than words of limitation, the scope of the invention is indicated by the appended claim(s) rather than by the foregoing description, and all changes which come within the meaning and range of equivalency of the claim(s) are therefore intended to be embraced therein.

What is claimed is:

1. A fluid lock for permitting transiting an object between different fluid pressures through a transiting hole in a wall separating a higher fluid pressure side from a lower fluid pressure side on opposite sides of said wall, comprising higher and lower fluid pressure doors, connecting means operatively connecting said doors to the wall respectively on the higher and lower pressure sides for permitting relative movement of each door between an open position for permitting transiting through the hole from one to the other pressure side and a closed position for sealing said hole, transiting container means formed between the doors in closed position having an inner surface closely form fitting the transiting object for minimizing the loss of fluid between the sides during transiting the object through the hole, said doors having inner faces facing in closed position, being spaced apart at least the thickness of the transiting object, so the object can be located between the door innerfaces with both doors in closed and sealed positions, and two windows, one in each door in front of the transiting object so that the transiting object, if a human being, can simultaneously see either pressure side when both doors are in closed position.

2. The fluid lock of claim 1, further comprising
   the connecting means for each door including latching means for each door for closing and sealing that door in its closed position.

3. The fluid lock of claim 2, further comprising
   the connecting means for each door including latch interconnecting means operatively connecting the latching means for each door, so that one door must be in closed and sealing position before the other door can be moved toward its open position.

4. The fluid lock of claim 2, further comprising
   the connecting means including hinge means on one side of each door and the latching means on the other side of each door.

5. The fluid lock of claim 4, further comprising
   latching means for both doors being located on the same side of the hole,
   each door including a latch operator easily actuated by a human being, if the transiting object, while located between the doors.

6. The fluid lock of claim 4, further comprising
   both hinge means being located on the same side of the hole,
   so that the transiting object, if a human being, can easily enter and leave the transiting hole along the same edge of the hole.

7. The fluid lock of claim 1, further comprising
   at least one of the doors including a door shell, and
   space filler means carried by the inner face of that door and forming the inner surface for that door closely form fitting the transiting object.

8. The fluid lock of claim 7, further comprising
   said space filler means being removably carried by the door.

9. The fluid lock of claim 8, further comprising
   said space filler means including one or more space filler pieces, each detachably connected to the door shell by VELCRO material having engagable hook and eye means.

10. The fluid lock of claim 7, further comprising
    the space filler means being solid, low mass material, substantially lower in mass than the door shell to provide a lower, overall weight, door structure.

11. The fluid lock of claim 1, further comprising
    the inner surface of the doors, for closely form fitting the transiting object if a human being, is also shaped to store a suit worn by the transiting human being in the fluid lock, whether the suit be formed of rigid metal or flexible material.

12. The fluid lock of claim 1, further comprising
    the inner surface for closely form fitting the transiting object, if a human being, being split along a parting surface on approximately the mid-plane of symmetry of a seated human being and approximately coplanar with the hole.

13. The fluid lock of claim 1, further comprising
    the inner surface for closely form fitting the transiting object, if a human being, sized to accept a fully suited, upright, approximately 95th percentile man.

14. The fluid lock of claim 11 further comprising
    the closed doors forming with the opening a generally cylindrical chamber split longitudinally along a parting surface extending
    approximately coplanar with the hole, and
    approximately longitudinally of, and perpendicularly to, the human mid-plane of symmetry.

15. The fluid lock of claim 1, further comprising a transparent window in at least one door in front to the eyes of a human being, if it be the transiting object.

* * * * *